Nov. 3, 1959 A. MICOZZI 2,911,243

DEVICE FOR JOINTING TUBULAR MEMBERS

Filed July 24, 1957 3 Sheets-Sheet 1

INVENTOR.
Alfredo Micozzi
BY Michael S. Striker
Attorney

Nov. 3, 1959   A. MICOZZI   2,911,243
DEVICE FOR JOINTING TUBULAR MEMBERS
Filed July 24, 1957   3 Sheets-Sheet 2
FIG. 7
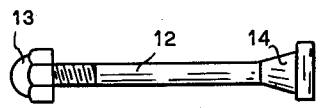
FIG. 8
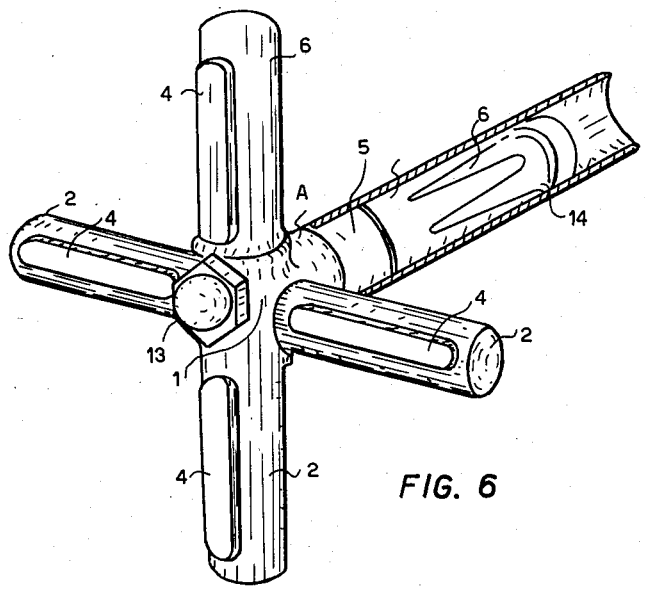
FIG. 6
FIG. 14
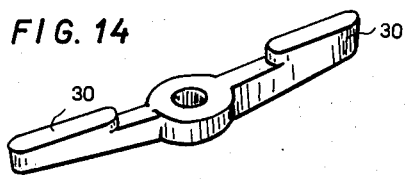
FIG. 15
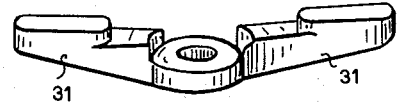
FIG. 16
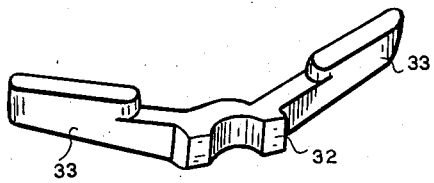
FIG. 17
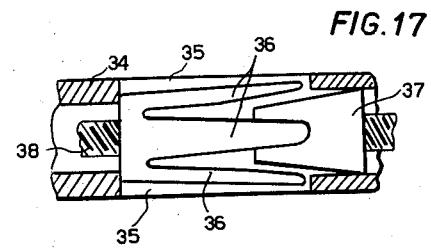
INVENTOR.
Alfredo Micozzi
BY Michael S. Strika
Attorney Nov. 3, 1959 A. MICOZZI 2,911,243
DEVICE FOR JOINTING TUBULAR MEMBERS
Filed July 24, 1957 3 Sheets-Sheet 3

INVENTOR.
Alfredo Micozzi
BY Michael S. Striker
Attorney

United States Patent Office 2,911,243
Patented Nov. 3, 1959

2,911,243

DEVICE FOR JOINTING TUBULAR MEMBERS

Alfredo Micozzi, Rome, Italy, assignor to Ponteggi Tubolari Dalmine Innocenti S.p.A., Milan, Italy, a company of Italy Application July 24, 1957, Serial No. 673,844

Claims priority, application Italy July 27, 1956

10 Claims. (Cl. 287—54)

The present invention relates to a device for connecting tubular members.

The purpose of the device is to give the possibility of rigidly connecting together, in an easy and speedy way, the ends of two or more tubular elements of any size, whatever their reciprocal position may be, either in the same plane or in different planes, making their axes to converge in one point. In other words, the device would embody the coupling of a network of tubular members, the members thereof being settled into a perfect static stability.

The device is perfectly fit for use either with midget-type structures and for large and very large ones such as, for instance, industrial shelves and racks, scaffoldings, stagings, prefabricated houses or structures, centering bearings for ferroconcrete structures, furnishings, etc., as well as for various emergency uses.

The device according to the present invention is substantially characterized by this, that it comprises at least one female element which is inserted in the end of the tubular member to be connected, said female element co-operating with a male element which is placed into a housing or seating of said female element and is provided with at least one radial nosing or projection which enters a corresponding slot of the female element, the device being completed by screw-means which are placed externally relative to the end of the tubular member and are perpendicular to the axis of said member, so as to give way to a reciprocal movement of said two male and female elements and to make the nosings or projections of the male element to come out through the slots of the female element, thus originating a radial load upon the inner surface of the tubular member and fastening said member by friction.

The invention will be described, only by way of example, with reference to the accompanying drawings, wherein:

Fig. 6 is a perspective view of the assembled device;

Fig. 7 shows a variant of the fastening screw;

Fig. 8 is a perspective view of a variant of the expansion clamp;

Fig. 14 and Fig. 15 are perspective views of two matched male-elements, each one having two opposed arms;

Fig. 16 is a perspective view of a male element having two arms at a right angle;

Fig. 17 is a longitudinal section of an expansion clamping device, according to a different embodiment.

Figure 1:
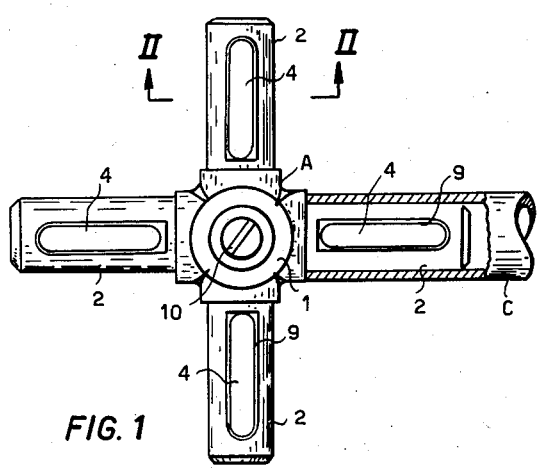
Fig. 1 is a plan view of a preferred embodiment of the device for connecting together five converging members.

Referring now to Figs. 1 to 6, A indicates the female connecting element, which is comprised of a central hub 1 and of four cylindrical arms 2, said arms 2 being at right angles relative to each other and all lying in the same plane. The male connecting element is comprised of a hub 3 and of four radial arms 4, which are also at right angles with each other and lie in the same plane. To the hub 3 is connected a cylindrical, hollow member 5 which is perpendicular to the plane of the arms 4 and is provided with longitudinal slits 6.

The element A comprises in its center a cylindrical housing or cavity 7, in which is housed the hub 3, as well as projections 8 forming recesses 8' in each one of the arms 2, in which are housed the arms 4 of the element B. Said arms 4 have a longitudinal nosing, or projection, that match the transverse apertures 9 of the arms 2 (see Fig. 1 and Fig. 3). The device is completed by the screw 10, the head of which rest frontally against the hub 1 of the element A, while its shank is placed along the axis of the cylindrical element 5 and mates with a nut screw 11 having the shape of a truncated cone, which is housed inside of the element 5.

The two elements A and B are reciprocally placed as described above and as shown in Figs. 1 and 3. The four arms 2 of the element A are inserted in the ends of the tubular members to be jointed together, as for instance the tube C of Fig. 1, while the element 5 is inserted in the fifth tube, so as to form a coupling of a tubular structure in which are converging four tubular members which are perpendicular to each other and lie in the same plane, and a fifth member which is perpendicular to the plane thereof. By tightening the screw 10 and its associated nut screw 11 a double action will take place: the expansion of the element 5, which is pressed into friction against the inner surface of the corresponding tube, and the reciprocal movement of the elements A and B, with the effect of pushing the nosings or projections of the arms 4 throughout the slots 9, thus fastening by friction the respective tubular members. The five tubular members are thus fixedly jointed together.

It will be appreciated that a device according to the present invention may also have, instead of four arms 2 and 4, a different number of arms, that the arms thereof, instead of being at right angles relative to each other may be placed at different angles, and that the element 5 for clamping the fifth tube may also not exist.

In Fig. 7 is shown a different embodiment of the fastening screw, in which the shank 12 is threaded at the end which is projecting out of the hub 1, where it co-operates with the nut 13. The expansion of the element 5 is obtained by means of the conical head 14.

In Fig. 8 is shown a piece part 5' which is similar to the above described element 5 but is separated from the hub 3 so as to simplify its manufacture and to make possible its elimination if its presence is not required.

Figure 9:
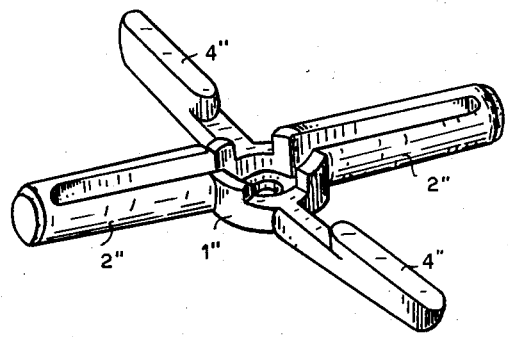
Fig. 9 is a perspective view of a four-arm connecting element having two male arms and two female arms.

In Fig. 9 is shown an element having four radial arms at right angles and lying in the same plane, that comprises a hub 1" and two pairs of opposed arms, which are indicated respectively by 2" (female arms) and 4" (male arms) and correspond to the arms 2 and 4 of Figs 1 to 6. By means of two elements as per Fig. 9 matching each other and rotated by 90° relative to each other it is possible to embody a jointing device for connecting four converging tubes, substantially corresponding to the type that is shown in Fig. 1.

Figure 10:
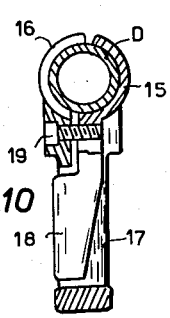
Fig. 10 and Fig. 11 are respectively a sectional view and a plan view of an embodiment for connecting a through tube and a head tube.
Figure 11:
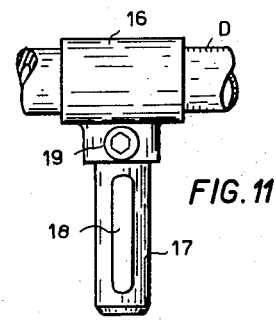

Fig. 10 and Fig. 11 are respectively a sectional view and a plan view of an embodiment for connecting two tubular members at a right angle and in the same plane, and precisely a through tube and a head tube. The through tube D is placed between two semi-cylindrical shells 15 and 16. The shell 16 is connected to the cylindrical arm 17, which is of the female type like the arm 2 of Fig. 3, while the shell 15 is connected to the male arm 18, which is similar to the arm 4 of Fig. 3. The arm 17 is inserted in the end of the head tube (not being shown) to be jointed to the through tube D. By tightening the fastening screw 19 the shells 15 and 16 will be pressed against the tube D, while the male arm 18 will come out of the slot of the female arm 17, thus fastening by friction the head tube which is invested upon the arms 17 and 18 thereof.

Figure 12:
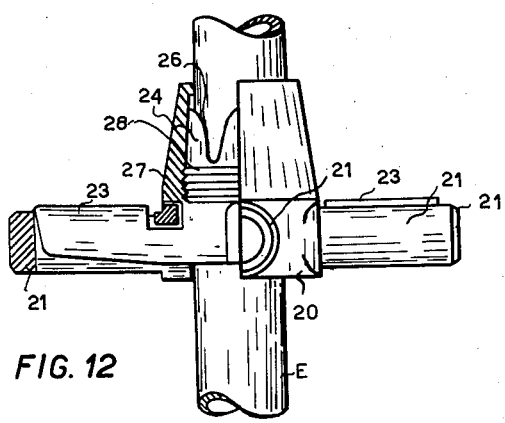
Fig. 12 is an elevational view, with partial cutaways, of an embodiment for connecting four converging tubes and a through tube.

In Fig. 12 is shown a device for connecting four tubular members lying in the same plane and converging in a coupling and a through tube E, which is perpendicular to the plane thereof. In this embodiment the hub 20 of the female element, having four female arms 21, is provided with an axial hole having a suitable size so as to contain the through tube E; a similar hole exists also in the hub 22 of the male element having the male arms 23. The male element thereof is also provided, as in the example of Figs. 1 to 6, with a cylindrical element 24 having the longitudinal slits 26, but in this instance the through tube E is placed inside of the element 24 instead of being placed outside of it. The device is completed by a threaded locking ring 27 having the shape of a truncated cone, that surrounds the element 24 and mates the threaded portion 28 of it, so that by tightening the locking ring 27 the element 24 will be pressed against the through tube E, thus fastening the same, and at the same time the reciprocal movement of the male and female arms 21 and 23 will take place thus carrying into effect the fastening, by friction upon the inner surfaces, of the four tubular members (not being shown) with which the arms thereof are invested.

Figure 13:
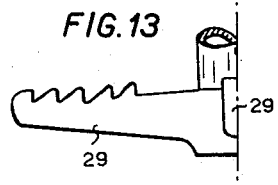
Fig. 13 shows a detail of a male-element arm, according to a variant.

In Fig. 13 is shown a detail of a male element wherein the nosing or projection is so indented as to make sure that, by effect of the eventual deformation or strain of the indentation crest when it is pressed against the inside surface of the tubular member, the fastening action upon the tubular member thereof will take place in a proper way.

Figure 5:
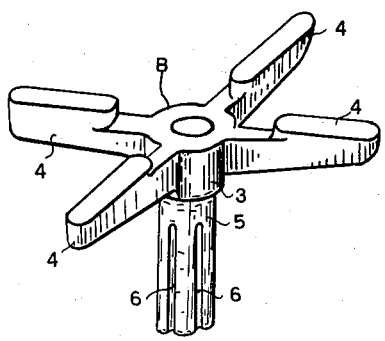
Fig. 5 is an elevational perspective view of the male connecting element.
Figure 2:
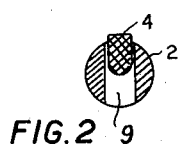
Fig. 2 is a sectional view of Fig. 1 on the line II—II.

In Fig. 14 and in Fig. 15 are shown two male elements, each one of them having a central hub and two opposed arms, which are indicated respectively by 30 and 31. The two male elements thereof are so shaped as to properly match each other, so that by laying the one of them upon the other a four-arm element, similar to the one that is shown in Fig. 5, will be obtained. The advantages of such an embodiment consist of this, that the construction is easier, and besides, by giving the facing surfaces of the two hubs a suitable spherical shape it will be possible to obtain a reciprocal and proper settling of the two elements, so as to secure a perfect adhesion of the four arms to the inside surfaces of the four tubular members.

In the embodiment that is shown in Fig. 16 the hub 32 is limited to half a circumference and has two arms 33 at a right angle with each other. Two elements as per Fig. 16 would embody a four-arm element similar to the one that is shown in Fig. 5.

Figure 3:
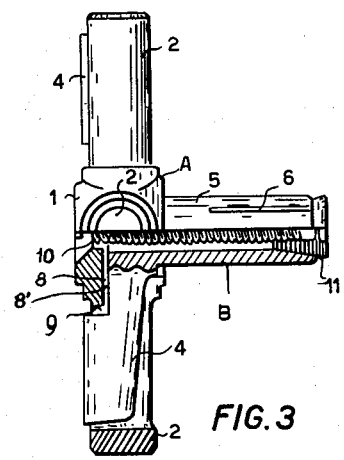
Fig. 3 is a side elevational view of the same embodiment with partial cutaways.
Figure 4:
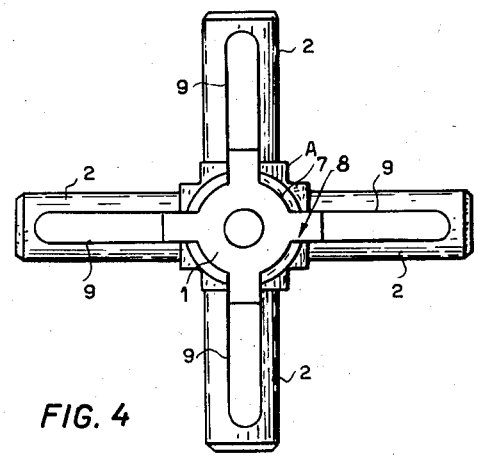
Fig. 4 is a plan view of the female connecting element.

In Fig. 17 is shown a cylindrical element 34 of the type being illustrated in Fig. 3, wherein it is indicated by 5, havng four longitudinal slots 35. Inside of the element 34 thereof is placed an expansion-type locking means comprising four tongues 36 which are placed respectively in front of the four slots 35. A nut screw 37, having the shape of a truncated cone, in co-operation with the fastening screw 38 controls the expansion of said tongues 36, so as to press the tongues thereof against the inner surfaces of the tubular member (not being shown) that surrounds the element 34. This embodiment of the expansion clamp prevents the element 34 from being damaged, should the device be locked without the corresponding tubular member being present.

The device according to the present invention besides giving the possibility of a speedy and perfectly reliable connection, with its component parts almost completely hidden inside of the tubular members, is always in the condition of having all its piece parts assembled together also when it is not being used.

It will be appreciated that the number of arms as well as their orientation may differ from the examples hereinbefore given, and that other modifications will occur to others upon a reading and understanding of this specification. It is my intention to include all such modifications as part of my invention insofar as they come within the scope of the appended claims.

I claim:

1. A coupling for connecting a plurality of structures, each formed with an elongated cavity therein, comprising, in combination, two coupling members, each having a plurality of elongated arms, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair mating said aperture for passage therethrough; and pressure means for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling.

2. A coupling for connecting a plurality of structures, each formed with an elongated cavity therein, comprising, in combination, two coupling members, each having a plurality of elongated arms, each arm of one of said members forming a coordinated pair with one arm of the other member and insertable jointly therewith in the cavity of one of said structures, the insertable portion of one of the arms of said coordinated pair being formed with a transverse aperture, and the center portion of the respective coupling member having a cavity and projections forming recesses adjacent to said apertures; a transverse projection on the insertable portion of the other arm of said pair mating said aperture for passage therethrough, the insertable portion of said other arm having a portion engaging said recess; and pressure means for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling.

3. A coupling for connecting a plurality of structures, each formed with an elongated cavity therein, comprising, in combination, two coupling members, each having a plurality of elongated arms, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair mating said aperture for passage therethrough; and pressure means connecting the non-insertable respective portions of said coupling members for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling.

4. A coupling for connecting a plurality of structures, each formed with an elongated cavity therein, comprising, in combination, two coupling members, each having a plurality of elongated arms, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair mating said aperture for passage therethrough; and screw means threadedly engaging one of said coupling members and abutting against the other coupling member for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling.

5. A coupling for connecting a plurality of structures, each formed with an elongated cavity therein, comprising, in combination, two coupling members, each having a hub portion and a plurality of elongated arms mounted on and extending from said hub portion, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair mating said aperture for passage therethrough; and pressure means for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling.

6. A coupling for connecting a plurality of structures, each formed with an elongated cavity therein, comprising, in combination, two coupling members, each having a hub portion and a plurality of elongated arms mounted on and extending from said hub portion, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair mating said aperture for passage therethrough; and screw means threadedly engaging the hub portion of one of said coupling members and abutting against the hub portion of the other coupling member for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling.

7. A coupling for connecting a plurality of structures, each formed with an elongated cavity therein, comprising, in combination, two coupling members, each having a hub portion and a plurality of elongated arms mounted on and extending from said hub portion, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair mating said aperture for passage therethrough; screw means threadedly engaging the hub portion of one of said coupling members and abutting against the hub portion of the other coupling member, said screw means being rotatable for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling; and expanding mandrel means mounted on said screw means and expandable by the rotation thereof, said mandrel means being insertable in the cavity of one of said structures for frictional engagement therewith when said arms are displaced relative to each other.

8. A coupling for connecting a plurality of structures, each formed with an elongated cavity therein, comprising, in combination, two coupling members, each having a hub portion and a plurality of elongated arms, mounted on and extending from said hub portion, said hub portion being shaped so as to form the jaws of a clamp space for clamping therein one of said structures, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair mating said aperture for passage therethrough; and screw means threadedly engaging one of said coupling members and abutting against the other coupling member for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling, while one of said structures is simultaneously clamped between said hub portions.

9. A coupling for connecting a plurality of structures, each formed with an elongated cavity therein, comprising, in combination, two coupling members, each having a hub portion and a plurality of elongated arms mounted on and extending from said hub portion, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair mating said aperture for passage therethrough; screw means threadedly engaging the hub portion of one of said coupling members and abutting against the hub portion of the other coupling member, said screw means being rotatable for transversely displacing said paired arms relative to each other, whereby in the inserted portion said projection on the other arm may be pressed through said aperture against one wall of said cavity in one of said structures and said one arm may be pressed against the opposite wall thereof for frictional engagement of said structure with said coupling; and expanding mandrel means mounted on said screw means and expandable by the rotation thereof, said mandrel means being insertable in the cavity of one of said structures for frictional engagement therewith when said arms are displaced relative to each other, said arms extending in a common plane from the hub portions of the respective coupling elements, said planes being parallel in the assembled position of said members, and said mandrel means extending perpendicularly therefrom.

10. A coupling for connecting a plurality of structures, each formed with an elongated cavity therein, comprising, in combination, two coupling members, each having a plurality of elongated arms, each arm of one of said members forming a coordinated pair with one arm of the other member and insertable jointly therewith in the cavity of one of said structures, the insertable portion of one of the arms of said coordinated pair being formed with a transverse aperture; a transverse projection on the insertable portion of the other arm of said pair, said projection having a serrated contact surface mating said aperture for passage therethrough; and pressure means for transversely displacing said paired arms relative to each other, whereby in the inserted portion said projection on the other arm may be pressed through said aperture with said contact surface against one wall of said cavity in one of said structures, and said one arm may be pressed against the opposite wall thereof for frictional engagement of said structure with said coupling.

References Cited in the file of this patent

UNITED STATES PATENTS

| | | |
|---|---|---|
| 1,860,866 | Marshall | May 31, 1932 |
| 2,065,902 | Levin | Dec. 29, 1936 |
| 2,817,547 | Canepa | Dec. 24, 1957 |

FOREIGN PATENTS

| | | |
|---|---|---|
| 677,108 | Great Britain | Aug. 6, 1952 |